US011436836B2

(12) United States Patent
Ramirez

(10) Patent No.: US 11,436,836 B2
(45) Date of Patent: Sep. 6, 2022

(54) VEHICULAR ACCESS SECURITY SYSTEM

(71) Applicant: Ricardo Ernesto Ramirez, San Salvador (SV)

(72) Inventor: Ricardo Ernesto Ramirez, San Salvador (SV)

( * ) Notice: Subject to any disclaimer, the term of this patent is extended or adjusted under 35 U.S.C. 154(b) by 164 days.

(21) Appl. No.: 16/946,594

(22) Filed: Jun. 29, 2020

(65) Prior Publication Data
US 2020/0410246 A1 Dec. 31, 2020

Related U.S. Application Data

(60) Provisional application No. 62/868,478, filed on Jun. 28, 2019.

(51) Int. Cl.
*G06K 9/62* (2022.01)
*G06V 20/52* (2022.01)
*G06Q 20/10* (2012.01)
*G07B 15/04* (2006.01)
*H04N 7/18* (2006.01)
*H04N 5/225* (2006.01)
*G06V 10/56* (2022.01)
*G06V 20/62* (2022.01)

(52) U.S. Cl.
CPC ........... *G06V 20/52* (2022.01); *G06K 9/6201* (2013.01); *G06Q 20/10* (2013.01); *G06V 10/56* (2022.01); *G06V 20/62* (2022.01); *G07B 15/04* (2013.01); *H04N 5/2253* (2013.01); *H04N 7/18* (2013.01)

(58) Field of Classification Search
CPC ........ G06V 20/52; G06V 10/56; G06V 20/62; G06V 20/625; G06V 10/147; G06V 20/54; G06K 9/6201; G06Q 20/10; G06Q 20/208; G07B 15/04; H04N 5/2253; H04N 7/18; H04N 7/188; G07F 17/24; G07F 17/244
USPC ........................................................ 382/105
See application file for complete search history.

(56) References Cited

U.S. PATENT DOCUMENTS

| | | | |
|---|---|---|---|
| 5,745,052 A | 4/1998 | Matsuyama et al. | |
| 7,119,674 B2 | 10/2006 | Sefton | |
| 7,471,189 B2 | 12/2008 | Vastad et al. | |
| 8,265,988 B2 | 9/2012 | Hedley et al. | |
| 8,279,088 B2 | 10/2012 | Khim | |
| 8,831,970 B2 | 9/2014 | Weik, III et al. | |
| 9,666,002 B2 | 5/2017 | Harucksteiner et al. | |
| 9,666,075 B2 | 5/2017 | Davies et al. | |
| 9,870,648 B2 | 1/2018 | Moran et al. | |
| 10,002,476 B1 * | 6/2018 | Ekin | G08B 13/08 |
| 10,037,690 B2 | 7/2018 | Finschi | |
| 11,003,919 B1 * | 5/2021 | Ghadiok | G06V 20/56 |

(Continued)

*Primary Examiner* — Ali Bayat
(74) *Attorney, Agent, or Firm* — Dunlap Bennett & Ludwig, PLLC

(57) ABSTRACT

An access point barrier system having a barrier that extends in such a way as to be movable between an enabled position and a non-enabled position preventing a vehicle from crossing the access point is provided. The image-capture device is integrated to the arm of the barrier and a computing device coupled to a database of registered vehicles, wherein the computing device is adapted to establish a match between the vehicle adjacent the barrier against the database of registered vehicles based on in part at least one image captured by the image-capture device so that an established match moves the barrier to the enabled position.

8 Claims, 9 Drawing Sheets

(56) References Cited

U.S. PATENT DOCUMENTS

| | | | |
|---|---|---|---|
| 2004/0233036 A1* | 11/2004 | Sefton | G07B 15/04 340/5.53 |
| 2011/0079167 A1* | 4/2011 | Yao | B60L 9/00 105/1.4 |
| 2014/0254877 A1 | 9/2014 | Jankowski et al. | |
| 2014/0334684 A1* | 11/2014 | Strimling | G07C 9/28 382/104 |
| 2016/0042575 A1 | 2/2016 | Ganguly et al. | |
| 2017/0109942 A1* | 4/2017 | Zivkovic | G07B 15/04 |
| 2017/0330389 A1 | 11/2017 | Shin | |
| 2018/0018870 A1 | 1/2018 | Sehra et al. | |
| 2018/0122152 A1 | 5/2018 | Shin | |
| 2018/0122153 A1 | 5/2018 | Shin | |
| 2019/0080595 A1 | 3/2019 | Liang | |

* cited by examiner

VEHICULAR ACCESS SECURITY SYSTEM

CROSS-REFERENCE TO RELATED APPLICATION

This application claims the benefit of priority of U.S. provisional application No. 62/868,478, filed 28 Jun. 2019, the contents of which are herein incorporated by reference.

BACKGROUND OF THE INVENTION

The present invention relates to vehicular access security systems and, more particularly, a vehicular access stop-point security system embodying a camera coupled to the arm of the barrier, wherein the system is adapted to recognize the vehicles at the stop point and manipulate the barrier accordingly.

For property allowing vehicular traffic, there are cameras at vehicular stop or entry points for capturing and retrievably storing images of the vehicles wanting to enter the property. At these vehicular entry points, there are barriers for blocking access to the vehicles and an associated electronic system that enables raising the barrier entry. But there are no systems that operatively associates the information captured by an input device and operation of the barriers to which the input device may be removably coupled.

As can be seen, there is a need for a vehicular access stop-point security system embodying a camera coupled to the arm of the barrier, wherein the system is adapted to recognize the vehicles at the stop point and manipulate the barrier accordingly.

The system minimizes the use of resources and dimensions of the barrier at the vehicular stop point, eliminating large-format side cameras and capturing more precise frontal images of the number on the plates. Additionally, the camera is operatively associated with a computer software application, streamlining the process of entry and exit through recognizing the plate and integrating the information via the application for the purpose of, among other things, registering vehicles and taking payment for accessing the stop point. The objective of the system embodied by the present invention may include integrating with existing electronic parking systems for optimizing information of the current video surveillance camera.

The demands and needs of security systems improved by the present invention include charging for the access to an associated space and selectively charging for a length of stay in said associated space as well as offering different levels of security. Thereby enabling users to customize the protocols of entry and exit to the parking lot and providing different solutions according to parking needs.

SUMMARY OF THE INVENTION

In one aspect of the present invention, an access point barrier system includes the following: a barrier that extends in such a way as to be movable between an enabled position and a non-enabled position preventing a vehicle from crossing the access point; an image-capture device integrated to said barrier, on its arm; a computing device coupled to a database of registered vehicles; and the image-capture device operatively associated with the computing device configured to establish a match between the vehicle adjacent the barrier against the database of registered vehicles based on in part at least one image captured by the image-capture device so that an established match moves the barrier to the enabled position.

In another aspect of the present invention, the access point barrier system includes a barrier that extends in such a way as to be movable between an enabled position and a non-enabled position preventing a vehicle from crossing the access point; an image-capture device integrated to a mid-portion of said barrier; a computing device coupled to a database of registered vehicles; and the image-capture device operatively associated with the computing device configured to establish a match between the vehicle adjacent the barrier against the database of registered vehicles based on in part at least one image captured by the image-capture device so that an established match moves the barrier to the enabled position, wherein the established match is a function of identifying a license plate of the vehicle and a brand, a model, or a color of the vehicle, and wherein the image-capture device captures a time associated with the enabled position; a coupling area extend from each side of the image-capture device; and both coupling areas anchored to the arm of the barrier; and a lighting sensor that transforms the light signals that the lens receives into electronic signals that can be transmitted in digital or analog form, a visor that makes the design waterproof by protecting the glass from the water drops and light, infrared LEDS which allows with its own light to keep viewing on dark environments, a glass for the protection of the infrared LEDS and its inside, and a wide-angle lens for the image-capture device, and a cable connector: an electrical connection between the cable connector and the computing device, wherein the electrical connection is attached to the inside of the barrier, wherein the computing device is operatively associated with a payment system, wherein the enabled position is a function of the payment system, and wherein the computing device is configured to register the vehicle to the database of registered vehicles as a function of the payment system and the at least one captured image.

If an articulated vehicle barrier is employed, the camera or image-capture device can be integrated in any part of the arm of the barrier, always disposed so as to capture information of the license plates or other desired information about the vehicle.

The present invention embodies an input device that aims to optimize the imaging of the license plates of cars entering or coming out through a check point. The input device may be a front camera with anchorage to rectangular tube or any other type of vehicular access control barriers, wherein the front camera is optimized in size and easily integrated into the operation of the vehicle access control barrier arm and monitoring system. Thereby, there is an optimization of space. Also, the present invention can send captured data to an application on the driver's smart device so that payment can be made and additional information about the space can be provided (such as, but not limited to the time allowed for using said space, as well as reminders send to the smartphone regarding soon-to-end allotted time).

These and other features, aspects, and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an access point barrier system having a barrier that extends in such a way as to be movable between an enabled position and a non-enabled position preventing a vehicle from crossing the access point; an image-capture device integrated to said barrier on its arm; a computing device coupled to a database of registered vehicles; and the image-capture device operatively associated with the computing device configured to establish a match between the vehicle adjacent the barrier against the database of registered vehicles based on in part at least one image captured by the image-capture device, wherein an established match moves the barrier to the enabled position.

Figure 1:
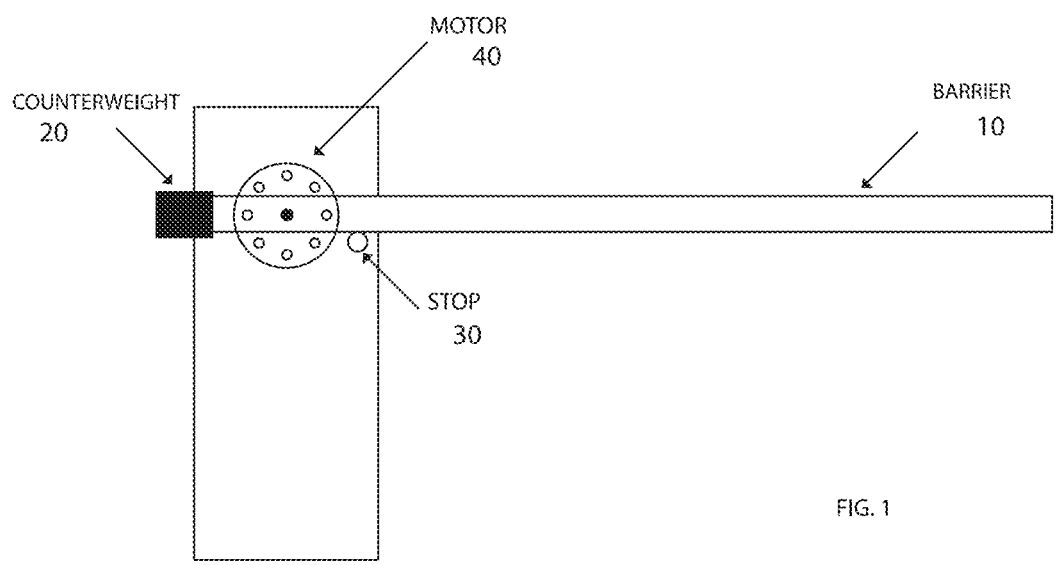
FIG. 1 is a schematic view of the prior art.
Figure 2:
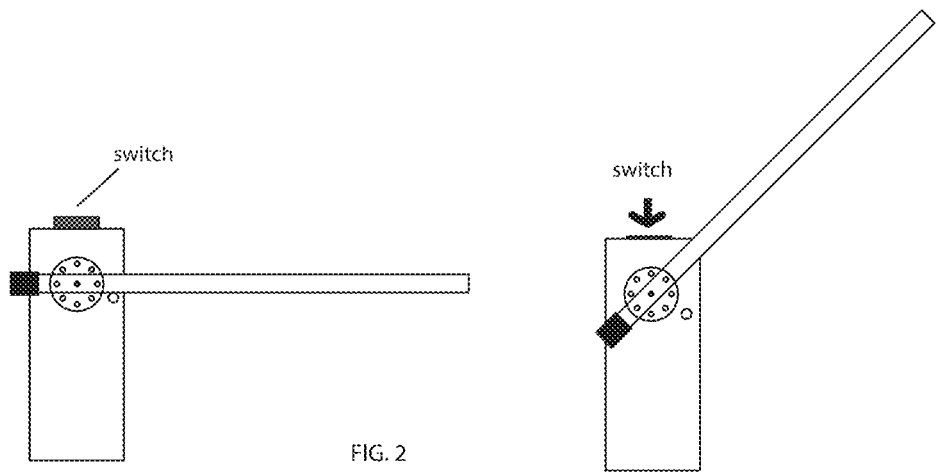
FIG. 2 is a schematic view of an exemplary embodiment of the present invention, illustrating a switch activation of the barrier.
Figure 3:
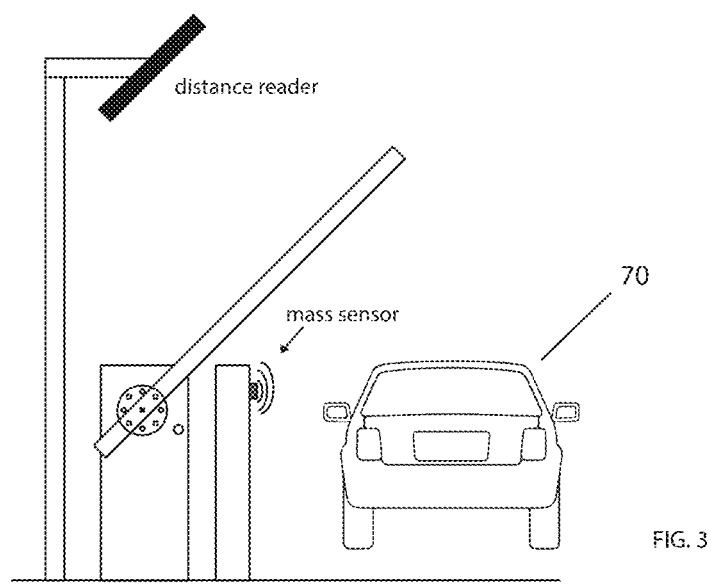
FIG. 3 is a schematic view of an exemplary embodiment of the present invention, illustrating a tag activation of the barrier.
Figure 4:
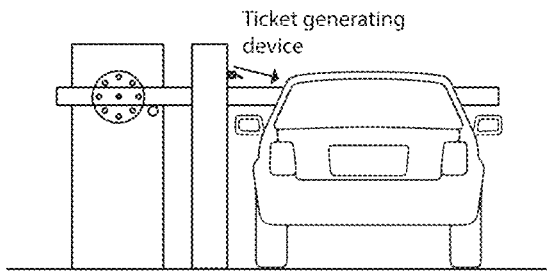
FIG. 4 is a schematic view of an exemplary embodiment of the present invention. Illustrating electronic payment activation of the barrier.
Figure 5:
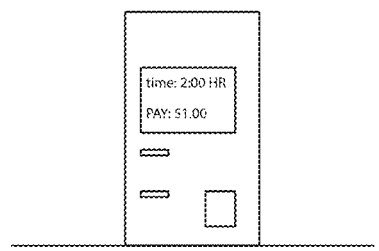
FIG. 5 is a schematic view of an exemplary embodiment of the present invention. Illustrating electronic payment activation of the barrier.
Figure 6:
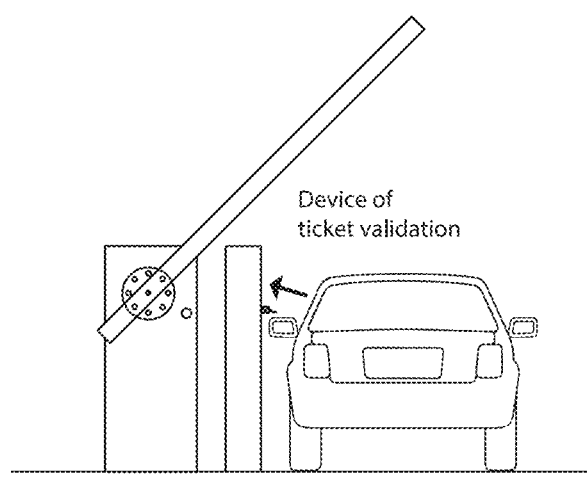
FIG. 6 is a schematic view of an exemplary embodiment of the present invention. Illustrating electronic payment activation of the barrier.
Figure 7:
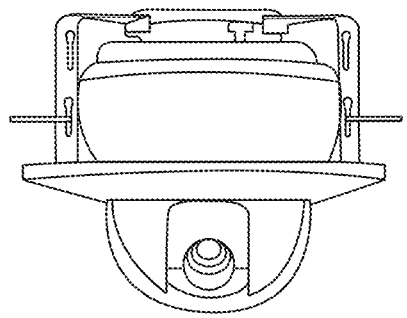
FIG. 7 is a perspective view of the prior art.
Figure 8:
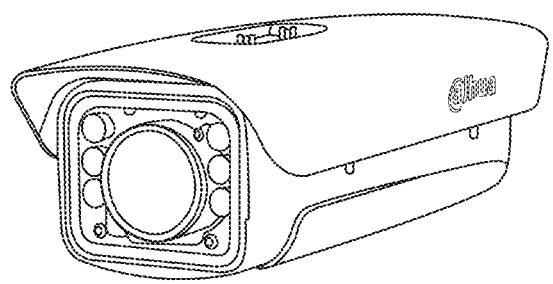
FIG. 8 is a perspective view of the prior art.
Figure 9:
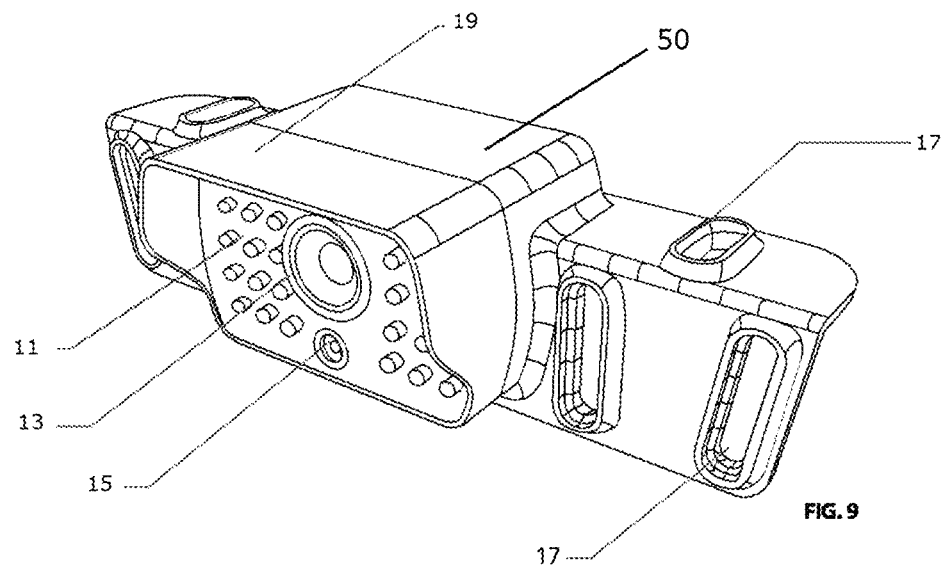
FIG. 9 is a perspective view of an exemplary embodiment of the present invention, including infrared LED 11, an input device/image-capturing-device/camera 13, a lighting sensor 15, holes for anchoring 17, and a visor 19.
Figure 10:
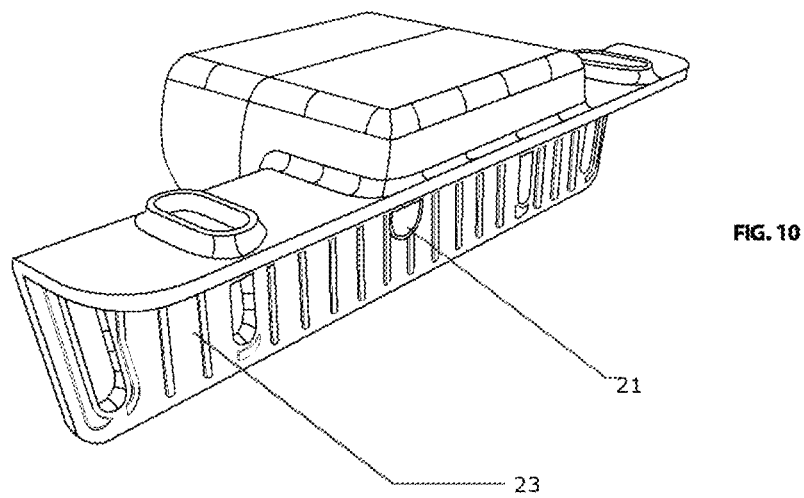
FIG. 10 is a perspective view of an exemplary embodiment of the present invention, illustrating a cable connector 21 for sending electricity to the input device 13 and sending information and a coupling area 23 allowing to connect to the input device 13 to rectangular format bars.
Figure 11:
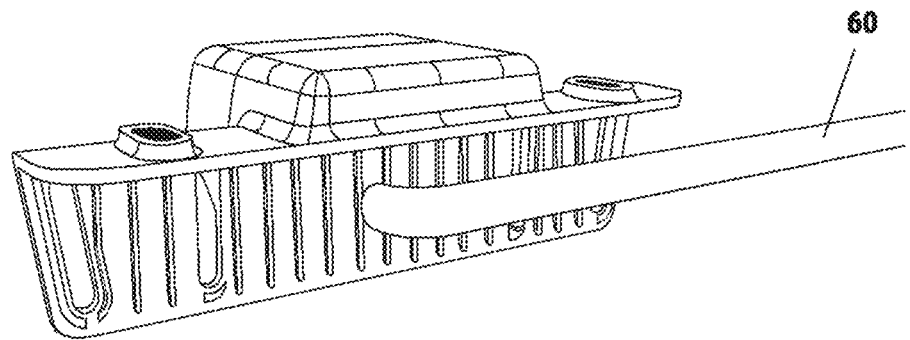
FIG. 11 is a perspective view of an exemplary embodiment of the present invention; illustrating the assembly of a sufficient electrical connection 60, such as a UTP cable connection 60 to the arm of the barrier 10.
Figure 12:
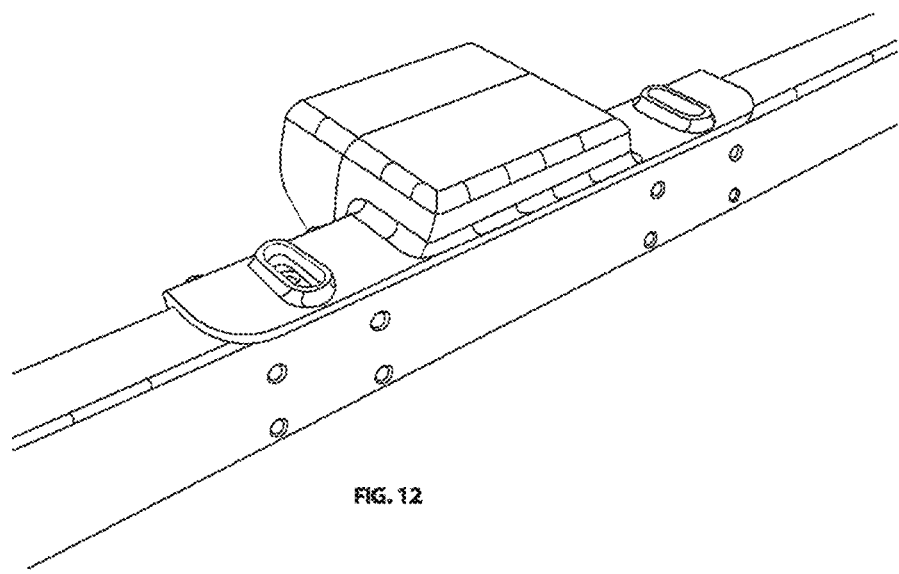
FIG. 12 is a perspective view of an exemplary embodiment of the present invention, illustrating coupling the input device 13 to the inside of the arm of the barrier 10.
Figure 13:
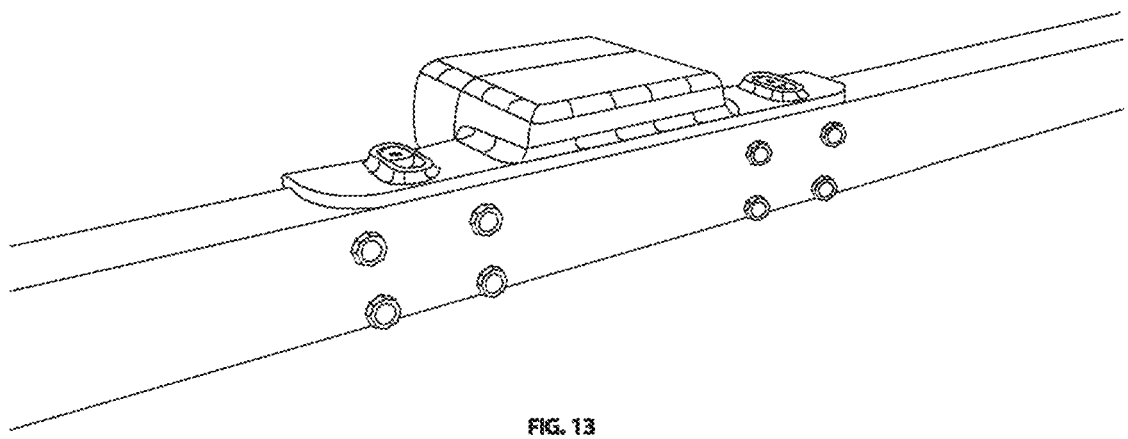
FIG. 13 is a perspective view of an exemplary embodiment of the present invention, illustrating the anchorage.
Figure 14:
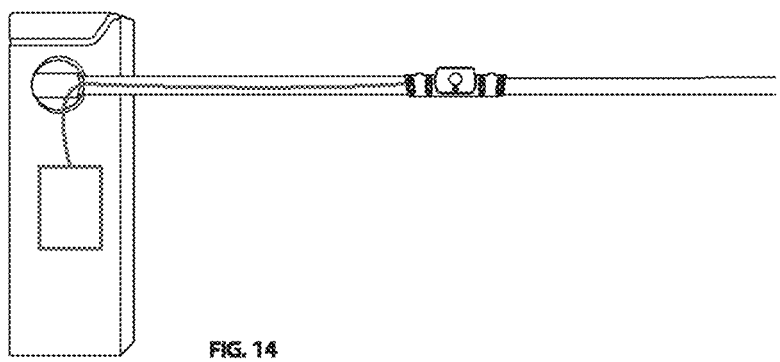
FIG. 14 is a schematic view of an exemplary embodiment of the present invention, illustrating the connection with the computing device.
Figure 15:
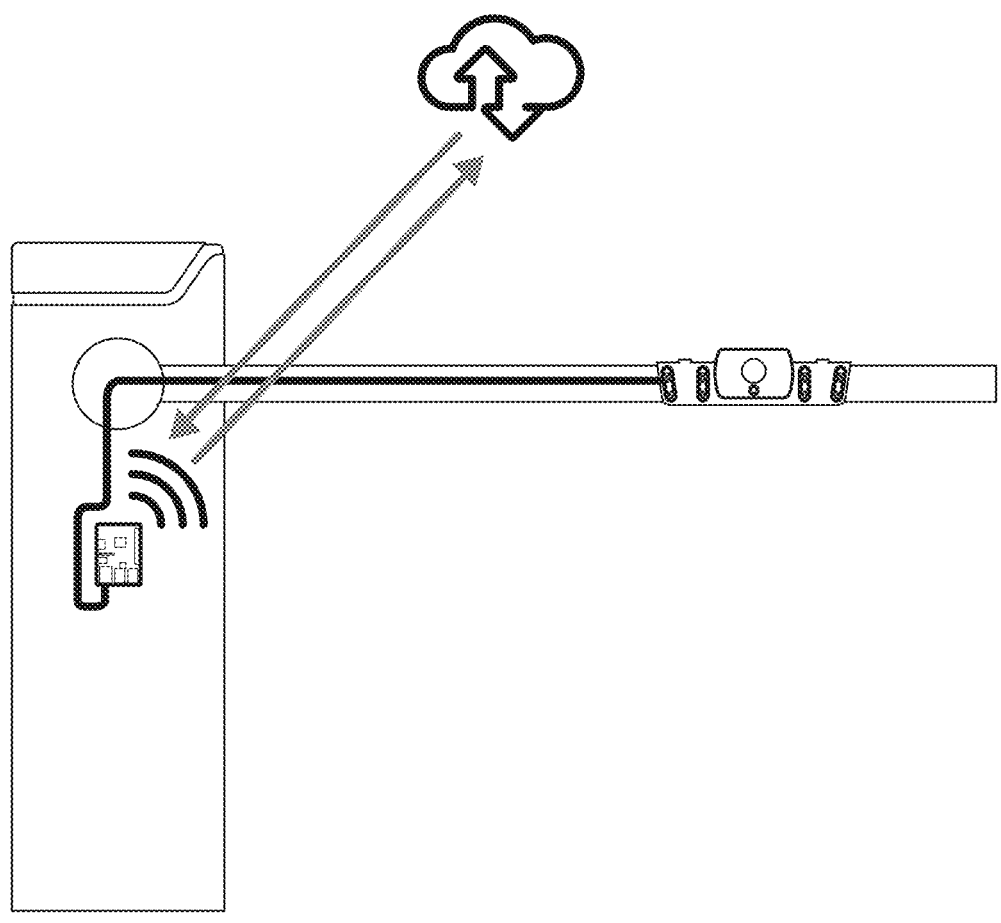
FIG. 15 is a schematic view of an exemplary embodiment of the present invention, illustrating connection to the cloud.
Figure 16A:
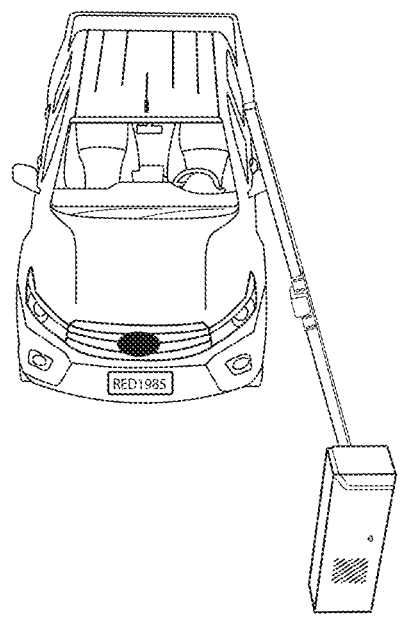
FIGS. 16A and 16B are perspective views of an exemplary embodiment of the present invention, illustrating functionality of the non-enabled list/condition and enabled list/condition, respectively.
Figure 16B:
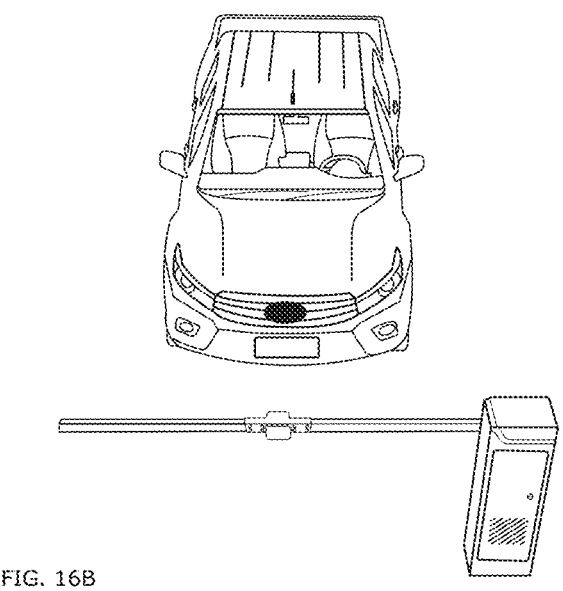

Referring now to FIGS. 1 through 16B, the present invention may include at least one computer with a user interface. The computer may include at least one processing unit coupled to a form of memory. The computer may include, but not limited to, a microprocessor, a server, a desktop, laptop, and smart device, such as, a tablet and smartphone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like. The computers may include single board controllers (SBC) that are the terminals or computers assigned to each of the barrier 10. One local computer can control from one to unlimited barriers if the barrier is in the local network, another option is if a cloud server is used, it can control any barrier worldwide through Internet.

The barrier 10 may include the following: a counterweight 20 which counteract the force by the volume of the gate to allow its rotation; a stop element 30 that prevents the displacement of prolonged rotation of the gate; a motor 40 that generates the radial displacement for the rotation of the gate; an anchor (such as a bar to a rotating shaft); a camera 50 with infrared LED and lightning sensor; and a sufficient electrical connection 60, such as a UTP cable connection 60.

The camera 50 may be incorporated in two walls 23 which are perpendicularly arranged on a supporting surface, which surface is the arm of the barrier, with the purpose of anchoring the camera 50 through holes 17 predisposed to be use with screws so it can be attach to the arm of the barrier 10 of the vehicular stop point (which may include a gate that also acts as the supporting surface) to anchor the camera 50. After anchoring the camera 50 to the arm of the barrier 10, the camera 50 may be coupled to the electrical connection/UTP cables 60 that may pass through the structure of the barrier that will be connected to the SBC, so that camera 50 captures the information transmitted to the SBC installed, in certain embodiments, adjacent to the barrier 10.

The captured information permits downstream processing and registration of captured data of the associated vehicle 70 and driver and/or owner thereof: such as license plate data, driver identification data, vehicle identification data, automobile brand, model, year, color, etc. A data system embodied by the present invention can manage, analyze and classify the captured data for preventing or providing access to the associated vehicle through the barrier.

The camera 50 may be fixed and has a wide-angle lens with LED lighting, the camera 50 should be connected all the time to the SBC and the server for the input of captured data, including captured images, captured video, captured audio, captured date and time, etc. The computer/SBC/server may process the captured data with algorithms that identify particular characteristics of each vehicle 70, The information will then be received by the data system, which may include a database. The database may categorize each vehicle 70 in one of a plurality of categories: 'granted, 'paid', 'probationary', 'delinquent', 'denied, and so forth, wherein some categories are associated with the removal of the barrier "enabled", while other categories are associated with the removal of the barrier "non-enabled", and may prompt a driver of the vehicle 70 for additional information.

The data system may manage the captured data in the cloud. When the car is registered on the enabled list, it may enable a relay for electrically powering the temporary removal of the barrier 10, or on the contrary, if the vehicle 70 is registered in the cloud on the non-enabled list, the relay is non-enabled, thereby not electrically powering the barrier 10.

For parking with rates, the user may have a mobile application that has the purpose of recording time and payment electronically. When entering the property, the camera 50 captures the image or otherwise acquires captured data, as the camera 50 may be continuously recording. Then the computer digitizes the captured data and transfers this information to the cloud. In certain embodiments, the vehicle 70 can move the entry barrier 10 only with the captured data acquired by the camera 50 and retrievably stored on the computer. After the vehicle 70 enters to the property, the vehicle 70 would be register on the non-enabled list automatically until the user executes the payment of electronically, the registered information of the vehicle 70 would be transfer to the enabled list, allowing the user to pass through the barrier 10. The built-in arm camera 50 sends back the information to validate the exit and activate the relay for moving barrier 50 from an inaccessible position to an accessible condition.

The present invention may be an integrated system of a wide-angle camera 50 anchored to the arm of the barrier 10 of an entrance and exit gate of a property, that is connected to a computer which creates a linkage to a cloud that manage the captured data and related register information.

The present invention is adapted to provide the collection, recognition, and management of captured data for vehicles 70 in such a way as to enable the entry and the exit of the vehicles 70 based on the register information, through an automated system of barriers 10. The present invention can be controlled through an application that manages a cloud link to a computer.

The present invention can provide a plates recognition system, when taking a captured image of the plates registered to the vehicle 70 at the entry point of a space. This process would keep the captured data on the surveillance systems concerning the users entering and leaving the place. The present invention can recognize of license plates, type of vehicle and their color, brand and model, among other things. Like the previous alternative, the use of only this protocol is oriented to the information of the user, the difference lies in the capture of more information so it can be able to process in a database particular characteristics of vehicle 70, whereby the system is adapted to automatically move (enable) or not move (non-enable) a barrier 10 using the captured data retrieved from a database in real time. By registering vehicular information with captured data and automatically processing the information of the plates, model and color, the information can be subsequently verified in a cloud that authorizes enabling or non-enabling the barrier 10 for granting access therethrough. An operator of the data system can also use the integrate access control to provide or facilitate a payment system. In certain embodiments, capturing the user's information through the captured data, the moment of entry and exit of the space can be determined, automatically calculating the time in which the user has been in the establishment. This information, in turn, can be processed through the software application whose function is to determine the charge for the stay in that place.

The computer-based data processing system and method described above is for purposes of example only and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. An access point barrier system, comprising:
   a barrier arm that extends in such a way as to be movable between an enabled position and a non-enabled position preventing a vehicle from crossing the access point;
   an image-capture device integrated to said barrier arm, wherein the image-capture device is attached to a midportion of the barrier arm;
   a computing device coupled to a database of registered vehicles;
   the image-capture device operatively associated with the computing device configured to establish a match between the vehicle adjacent the barrier arm against the database of registered vehicles based on in part at least one image captured by the image-capture device so that an established match moves the barrier arm to the enabled position; and
   a coupling area extend from each side of the image-capture device; and
   both coupling areas anchored to the barrier arm.

2. The access point barrier system of claim 1, further comprising: a lighting sensor, a visor, a wide-angle lens for the image-capture device, and a cable connector.

3. The access point barrier system of claim 2, further comprising: an electrical connection between the cable connector and the computing device, wherein the electrical connection is attached to the barrier arm.

4. The access point barrier system of claim 1, wherein the established match is a function of identifying a license plate of the vehicle and a brand, a model, or a color of the vehicle.

5. The access point barrier system of claim 1, wherein the image-capture device captures a time associated with the enabled position.

6. The access point barrier system of claim 1, wherein the computing device is operatively associated with a payment system, and wherein the enabled position is a function of the payment system.

7. The access point barrier system of claim 6, wherein the computing device is configured to register the vehicle to the database of registered vehicles as a function of the payment system and the at least one captured image.

8. An access point barrier system, comprising:
- a barrier arm that extends in such a way as to be movable between an enabled position and a non-enabled position preventing a vehicle from crossing the access point;
- an image-capture device integrated to a midportion of said barrier arm;
- a computing device coupled to a database of registered vehicles; and
- the image-capture device operatively associated with the computing device configured to establish a match between the vehicle adjacent the barrier arm against the database of registered vehicles based on in part at least one image captured by the image-capture device so that an established match moves the barrier arm to the enabled position, wherein the established match is a function of identifying a license plate of the vehicle and a brand, a model, or a color of the vehicle, and wherein the image-capture device captures a time associated with the enabled position;
- a coupling area extend from each side of the image-capture device; and
- both coupling areas anchored to the barrier arm; and
- a lighting sensor, a visor, a wide-angle lens for the image-capture device, and a cable connector: an electrical connection between the cable connector and the computing device, wherein the electrical connection is attached to the barrier arm, wherein the computing device is operatively associated with a payment system, wherein the enabled position is a function of the payment system, and wherein the computing device is configured to register the vehicle to the database of registered vehicles as a function of the payment system and the at least one captured image.

* * * * *